Dec. 10, 1963    H. HUBMANN    3,113,380
MOLD AND EXPRESSER SEALING MEANS
Filed Aug. 1, 1961
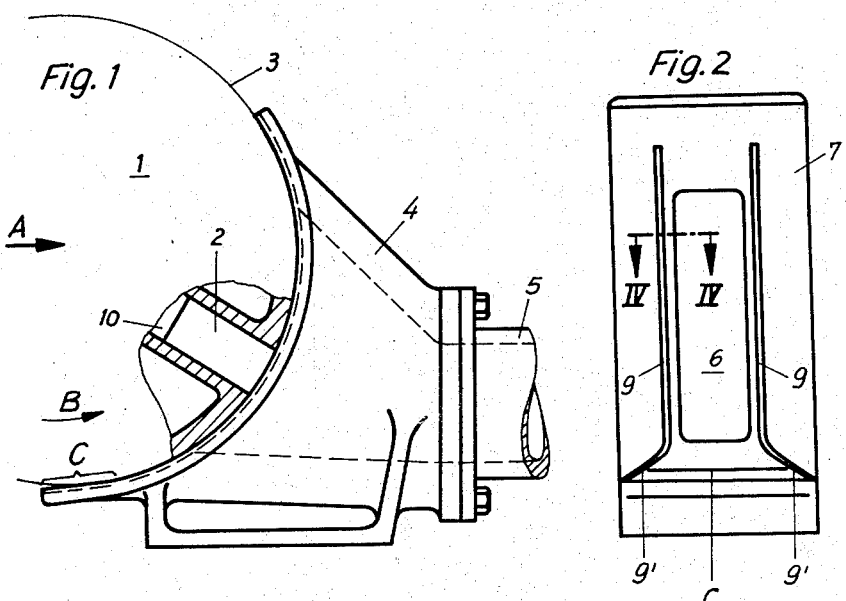
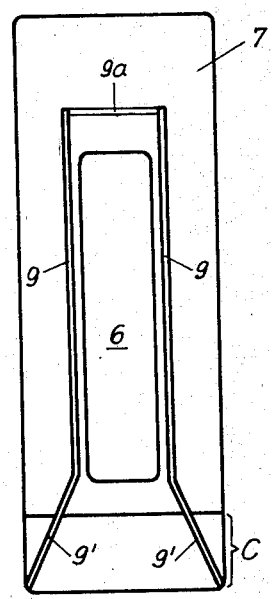
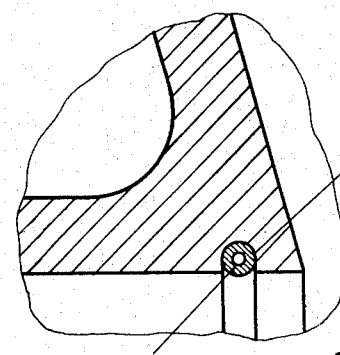
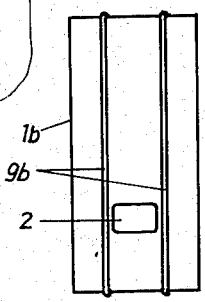

United States Patent Office 3,113,380
Patented Dec. 10, 1963

3,113,380
MOLD AND EXPRESSER SEALING MEANS
Hans Hubmann, Neuhausen am Rheinfall, Switzerland, assignor to Schweizerische Industrie-Gesellschaft, Neuhausen am Rheinfall, Switzerland
Filed Aug. 1, 1961, Ser. No. 128,456
Claims priority, application Switzerland Aug. 25, 1960
4 Claims. (Cl. 31—10)

The present invention relates to a dosing device for plastic substances, for example butter or margarine, having a dosing cylinder rotatable about its longitudinal axis, which contains at least one dosing chamber issuing at its circumference, part of said circumference being encircled by a stationary connector member from which the plastic material is forced into said dosing chamber through an outlet opening.

In such dosing devices, which co-operate for example with wrapping machines, the dosing cylinder is turned about its axis any time after the filling of the dosing chamber, until the dosing chamber lies outside the region of the connector member. Thereafter the material contained in the dosing chamber is expelled from the latter by means of a piston and passed on to further treatment. The dosing cylinder is then turned to its charging position and the dosing chamber is filled anew.

In order that leakage losses between the connector member and the dosing cylinder are obviated as far as possible, it is necessary to fit the circumference of the dosing cylinder and the concave surface of the connector piece accurately to one another. Nevertheless leakage losses may occur so that the plastic material is pressed axially relative to the dosing cylinder between its circumference and the concave surface of the connector piece.

The present invention has the primary object of overcoming this disadvantage.

With this and other objects in view which will become apparent later from this specification and the accompanying drawing, I provide a dosing device for plastic materials, comprising in combination: a dosing cylinder rotatable about its longitudinal axis, at least one dosing chamber arranged in said dosing cylinder and issuing at the circumference thereof, a stationary connector piece having a concave part-cylindrical surface partly encircling said dosing cylinder and having an outlet opening in this surface through which the plastic material is forced in operation into said dosing chamber, and sealing strips arranged on both sides of said outlet opening between the circumference of said dosing cylinder and the surface of said connector member.

These and other features of my said invention will be clearly understood from the following description of an embodiment thereof given by way of example with reference to the accompanying drawing in which:

FIG. 1 is a side elevation of the dosing cylinder showing portions thereof broken away to illustrate various details and of the connector member of a dosing device;

FIG. 2 is an elevation of the connector member as seen in the direction of the arrow A of FIG. 1;

FIG. 3 is a development of the concave sealing face of the connector member showing the same slightly enlarged, and FIG. 4 is a section on the line IV—IV of FIG. 2 on a larger scale;

FIG. 5 is a reduced plan view of a modified form of the invention relating to the details of the dosing cylinder.

In the drawing all those parts of the dosing device are omitted which are not required for the understanding of the invention. A dosing cylinder denoted by 1 is rotatable about an axis perpendicular to the plane of the drawing. This cylinder contains at least one dosing chamber 2 extending radially and issuing on the periphery 3 of the dosing cylinder. Part of the circumference 3 is encircled by a connector member 4, the interior of which is hollow. This member 4 is in communication with a supply line 5 for the material to be dosed, for example butter or margarine. The concave surface 7 of the member 4 (FIG. 2) has a rectangular outlet opening 6, which is in communication with the supply line 5 through said interior. At the lower end of the surface 7 a chamber C is arranged, i.e. the surface has some clearance there from the circumference of the dosing cylinder 1.

On both sides of the outlet opening 6 grooves 8 are provided in the surface 7, into which sealing strips 9 e.g. of rubber or a synthetic substance are inserted. These sealing strips run in the region of the outlet opening 6 parallel to the lateral edges of the latter and are conducted outward at an angle in the lowermost part of the surface 7 until they reach eventually the chamfer C of the outer edge of the surface 7.

The manner of functioning of the dosing device is as follows: In the position of the dosing cylinder illustrated in FIG. 1 the dosing chamber 2 is filled with the material to be dosed, e.g. butter, in that the same is introduced under pressure through the line 5 and is forced through the outlet opening 6 into the chamber 2, the length of which is bounded by a piston 10, which is shown only partly. Thereafter the dosing cylinder 1 is turned in the direction of the arrow B, until the dosing chamber is not covered any longer by the surface 7. Then the piston 10 pushes the content of the chamber 2 out, which is then pressed on the further treatment. The dosing cylinder 1 is then turned further until it reaches again its original position, and the dosing chamber is filled anew.

The sealing strips 9 prevent the material from being squeezed out laterally during the charging operation. In case any material is squeezed out at the narrow edges of the outlet opening 6, this is insignificant since this material is returned to the opening 6 when returning the dosing cylinder 1. In order to facilitate this operation, the said chamfer C is provided at the end of the surface 7, and the parts 9' of the sealing strips 9 are directed outward at an angle in the region of this chamfer. If necessary, sealing the strips 9 could be directed outward at an angle at both ends of the surface 7.

It would alternatively be possible to arrange the sealing strips 9b on the rotatable dosing cylinder 1b (FIG. 5) instead of on the stationary connector member 4. If necessary, sealing strips 9a could also be arranged at the narrow sides of the outlet opening 6 (FIG. 3).

While I have described herein and illustrated in the accompanying drawing what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. A dosing device for dispensing measured quantities of plastic materials, comprising a dosing cylinder mounted for rotation about its longitudinal axis and having a radially extending dosing chamber with an issuing opening at the circumference thereof, a stationary connector member for supplying material to said chamber having a cylindrical surface corresponding to the periphery of said cylinder and partly encircling said cylinder, said stationary connector member being provided with an outlet opening in said cylindrical surface through which plastic material is adapted to be forced into said dosing chamber, and relatively narrow sealing strips between the surface of said cylinder and the cylindrical surface of said connector member arranged on both sides of said outlet opening and spaced from the marginal edges thereof, said strips being arranged to extend circumferentially between said cylinder and said cylindrical surface of said connector member.

2. A dosing device as set forth in claim 1 in which the cylindrical surface of said connector is chamfered at one end to provide an entrance space between said cylinder and said connecting member.

3. A dosing device as set forth in claim 1 in which said sealing strips diverge outwardly adjacent one end of said connector member to provide an entrance guide for the material and to direct material on said cylinder toward the central portion of said connector member to the area of said opening.

4. In a dosing device for dispensing measured quantities of plastic materials, comprising a rotary cylinder mounted to rotate about its longitudinal axis and having a radially extending measuring chamber extending inwardly from the periphery thereof, a stationary connector member having an arcuately curved portion conforming to the contour of the surface of said cylindrical member, said connector member being provided with a discharge opening extending through the arcuately curved surface thereof and centrally located with respect thereto, a pair of parallel grooves formed in said arcuate surface and extending parallel one to the other on opposite sides of said opening, the end portions of said grooves being divergently arranged in a chamfered area of said arcuate surface, sealing strips mounted in said grooves to effectively seal the arcuately curved surface of said connector member and said cylinder and prevent the escape of plastic material in a direction toward the ends of said cylinder, and a material supply pipe attached to said connector member for supplying the same with plastic material, said plastic material being adapted to be forcibly discharged through said discharge opening when the measuring chamber of said cylinder is in registry therewith.

References Cited in the file of this patent
UNITED STATES PATENTS
2,010,524    McClatchie _____ Aug. 6, 1935